Aug. 21, 1956 L. F. HARZA 2,759,697
HYDRAULIC CONTROL FOR BUTTERFLY VALVES
Filed Oct. 20, 1950
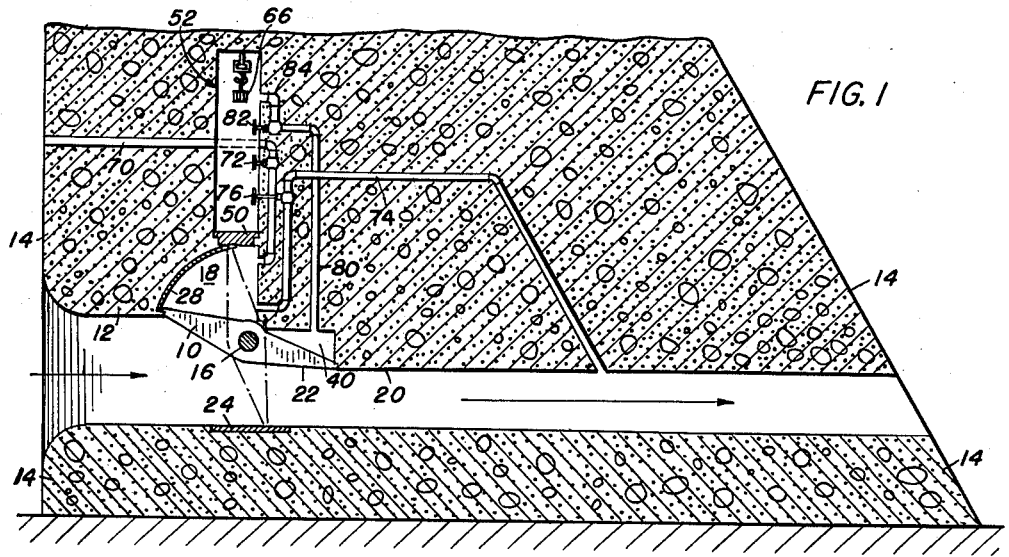
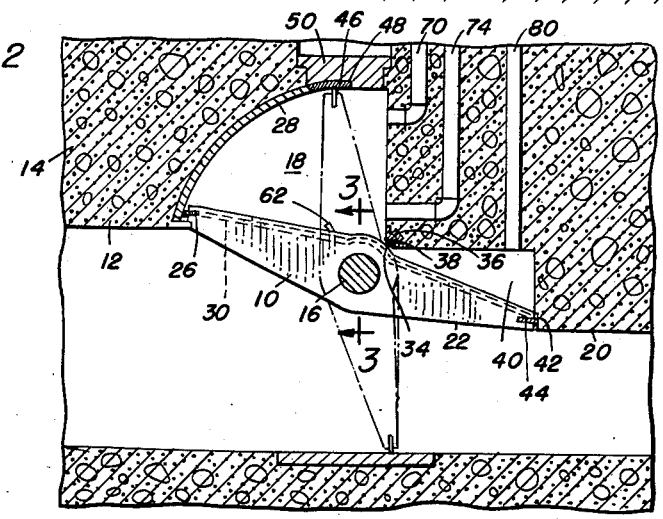
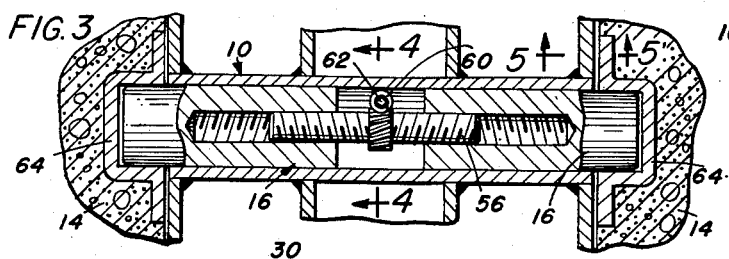
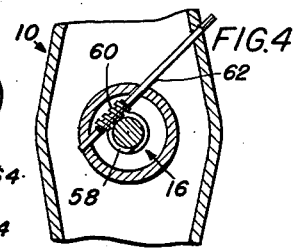
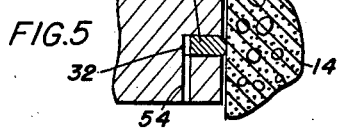
INVENTOR:
LeROY F. HARZA
BY
ATT'Y United States Patent Office 2,759,697
Patented Aug. 21, 1956

2,759,697

HYDRAULIC CONTROL FOR BUTTERFLY VALVES

Leroy F. Harza, Highland Park, Ill.; Fred H. Camphausen and Edward W. Hillier, executors of said Leroy F. Harza, deceased Application October 20, 1950, Serial No. 191,139

13 Claims. (Cl. 251—25)

This invention relates in general to butterfly valves and the construction is more particularly described as a hydraulic control valve for power turbines, free discharge water passages, and the like.

Gates or valves for the admission of water to hydraulic power turbines or for the free discharge of water through the bottom of dams are usually of the sliding or rolling type and must move in grooves or guide slots in the walls of the water passages. These guides form a source of disturbance and turbulence of the water flowing past them which is the source of the loss of energy to a hydraulic turbine. For free discharge openings where the water velocity is high, often nearly at spouting velocity, cavitation occurs in the gate guides, thereby causing disintegration and pitting of the metal and requiring frequent replacement or repair such as by rebuilding the metal in a welding process.

Round butterfly valves are often used in water passages with moderate velocities but cannot be used in free discharge passages unless near the extreme discharge end, because when open, they form an obstruction in the middle of the path of flow, causing extreme cavitation on the retreating side of the valve disc.

The present invention overcomes these objections by providing a butterfly valve with a preferably horizontal axis mounted in the roof of the water passage, only the lower half of the valve serving to open or close the passage, and the upper half occupying a cylindrical chamber.

An important object of the invention is to provide a valve mounted in the roof of a water passage and only a portion thereof serving to close the passage to eliminate mechanical operation and to substitute hydraulic control.

A further object of the invention is to provide a valved passage which is streamlined, thus avoiding any sudden enlargement which would cause cavitation.

A further object of the invention is to eliminate guide grooves on any of the four walls of the water passage.

Still a further object of the invention is to provide a substantially water-tight joint by sealing all of the edges of the valve for open and closed positions.

A further object of the invention is to provide a valve of this type which is substantially balanced, but having chambers by means of which it may be unbalanced to open or close the valve.

Still a further object of the invention is to provide a valve structure having a closed chamber above the valve by means of which the valve may be raised from a normal operating position for repairing or replacing the valve.

A further object of the invention is to provide mounting means for the valve, the ends of which may be retracted to withdraw the valve from its operating position.

Other objects of the invention will appear in the specification and will be apparent from the accompanying drawings in which:

Fig. 1 is a sectional view showing a butterfly valve structure as mounted in the passageway of a dam in accordance with this invention.

Fig. 2 is an enlarged sectional view showing the means for sealing a valve structure as shown in Fig. 1 in the walls which it engages.

Fig. 3 is a sectional view showing a valve mounting with retractible ends operated by a right and left screw;

Fig. 4 is a transverse sectional view of the right and left screw operating means taken on the line 4—4 of Fig. 3; and Fig. 5 is a sectional detail view of a side sealing means for the valve.

This invention comprises a butterfly valve 10 mounted in a chamber or recess at the top of a water passage 12 which may lead to a hydraulic power turbine or for the free discharge of water through a dam 14.

The valve is preferably mounted upon a horizontal axis, comprising a pair of shaft sections 16, and the opposite portions of the valve at the sides of the mounting are preferably tapered toward the edges thereof. The valve mounting is located in the roof of the water passage, the upper half of the valve occupies a segmental space or chamber 18, only the lower half of the valve serving to open and close the water passage. The water passage is preferably formed with a reduced discharging portion 20 at the relief side of the valve and one side 22 of the valve is so inclined that it makes a slope downward communicating with the reduced portion 20 of the passage as shown in Fig. 1. When open, the valve thus forms the roof of the water passage and is streamlined to cause a general contraction in the height of the water passage, thus avoiding any sudden enlargement which would cause cavitation.

Many kinds of seals have been used for butterfly valves, any of which are applicable to this construction. The preferred seals are metal to metal contacts of the machined edge of the valve against surfaces at the bottom such as an inset metal liner plate 24; a metal wiper 26 in a recess at the top of the valve to engage a curved metal insert 28 in the wall of the chamber 18; and side seals 30 set into recesses 32 at the sides of the valve.

There is also a curved surface 34 on the valve adjacent its mounting concentric with its shaft having a sufficient arc to cover the travel of the valve which is adapted to be closed by a seal 36 set into a recess 38 in the wall of the dam for separating this portion of the chamber 18 from a relief space or chamber 40 which is located in the upper wall of the passage and forms a recess into which the lower portion of the valve is movable when in its open position. The adjacent end of the valve engages a shoulder 42 in the wall surface at the end of the passage 40 and a sealing strip 44 is set into the end of the valve for engaging the shouldered part and also the plate 24.

Thus there are no guide grooves on any of the four walls of the water passage, the sides and bottom being preferably smooth and the gate at the top when open being preferably flush with the roof line in the approaching and receding edges of the passage.

The upper edge of the metal insert 28 has an extension 46 in a recess 48 of a removable cover plate 50 located at the top of the chamber 18, and the plate 50 also forms a closure between this chamber 18 and a chamber or gallery 52 above the valve through which the valve may be removed. The bottom plate 24 and the top middle insert 28, for example, may be of bronze or any soft metal; the inserts 26, 44 or 30 may be of rubber or other suitable material. The inserts 30 are seated in grooves extending along the sides of the wings from the axis to the ends of the wings and the space back of these strips may be open to head water pressure through small holes 54 spaced at intervals along the upstream surface of the wings thus holding the inserts by water pressure against the side walls of the passage. Stops (not shown) may be provided to prevent the strips from going out of the grooves when the valve is open. The bottom contact surface in the floor of the conduit and the side wall contact surfaces where the sealing strips rub when in motion as well as the segmental cylindrical surface where the top edge rubs, should all be of embedded metal with suitably machined surfaces.

The valve may be mounted upon the shaft sections 16 which are connected by a right and left screw 56 operated in opposite directions by a worm wheel 58 and a worm 60, the end of which extends upwardly and outwardly from the relief side of the valve, with a squared extremity 62 for engagement with a wrench. The ends of these shaft sections 16 are adapted to be seated in sockets 64 inset in the sides of the upper wall at the juncture of the chambers 18 and 40 and preferably directed below the partition plate 50 between the vertical portion of the chamber 18 and the gallery 52 over it. At the top of the gallery is a chain hoisting block 66 of any well known type adopted to hoist the valve from the passage when necessary for repair or replacement.

The chamber 18 is connected by means of a pipe 70 to the head water control by a valve 72 in the gallery 52, and is connected by a pipe 74 with the tail water in the passage 20 controlled by a valve 76 in the gallery 52. Likewise the chamber 40 may be provided with an optional air supply pipe 80 controlled by a valve 82 in the gallery 52 and leading to the atmosphere in the gallery through a pipe 84 as shown in Fig. 1.

There is nothing to prevent this valve from being operated in any conventional manner of butterfly valves as by extending the mounting shaft into an adjoining chamber and there providing it with a crank, hydraulic piston gear and motor driven pinions, and the like. Or any similar source of power could operate by attachment and engagement to the valve disc near the upper edge thereof with a rack and pinion operator instead of extending the shaft to a crank in an adjoining chamber.

The preferred method, however, is by hydraulic operation using the pressure of water from the dam itself through suitable passages and controlled by suitable valves as represented. When the valve is closed as shown by the broken line, the unit pressure on the upper half would ordinarily be slightly less than on the lower half because of the smaller depth below the water surface. It is desirable to compensate for this by having the upper half of the valve or gate a little longer than the bottom half and enough longer to furnish a small positive moment tending to hold the gate in closed position. When the gate is in partially or fully open position, the contraction of the water past the valve and the consequent conversion of static pressure to velocity will cause a considerably greater pressure on the upper half of the valve, thus always tending to close it.

In operation, if head water is opened into the chamber 18, through the pipe 70, the hydraulic balance or slight unbalance on the closing side of the valve is destroyed, and the pressure is substantially equalized on both of the upper sides of the valve. The pressure against the lower half of the valve then tends to open it as rapidly as water can enter the chamber 18 and this water pressure is constantly provided in chamber 18 to hold the valve open.

As soon as the valve is fully open, however, chamber 40 becomes a closed chamber and venting it to the atmosphere through the pipe 80 will tend to offset the tendency of the valve to close. The valve can be readily closed at any time by merely relieving the pressure in chamber 18 by closing the head water connection through the valve 72, and if necessary, relieving the chamber 18 through the pipe 74 to the tail water.

The pipe 80 for supplying air to the chamber 40 may be used when the valve is partly open, if necessary, to furnish air to the discharging water, thus tending to relieve vacuum behind the partially open valve and tending to inhibit vibration of the valve. As necessary with all free discharge valves within a conduit, it is intended that the valve be entirely open or entirely closed except for a few moments required for the change.

Although the valve is here represented as being rectangular on both sides of its center, the lower side blade may be semicircular and the upper one rectangular, or both blades may be semicircular. They may also be oval or elliptical, but these circular forms are difficult to pack and to make water-tight about the edges.

While a preferred construction of this invention has been described in some detail, it should be regarded as an illustration or example rather than as a limitation or restriction of the invention, since various changes in the construction, combination, and arrangement of the parts may be made without departing from the spirit and scope of the invention.

I claim:

1. A butterfly valve structure comprising a casing having a passage therein, a butterfly valve enclosed in the casing and pivoted at the top of the passage so that the lower portion of the valve closes the passage, the passage being reduced in size on the downstream side of the valve and having a recess to receive the upper portion of the valve in the closed position, and the valve being tapered at opposite sides of its pivot to form a continuous passage in open position with the receding valve surface inclined downwardly to and flush with the top surface of the reduced portion of the passage.

2. The combination of a casing having a water passage therein and a butterfly valve pivotally mounted in a recess in the top of the passage, the passage decreasing in size on the downstream side of the valve and the valve being tapered in size from its mounting to the opposite ends thereof, one tapered side of the valve reducing the larger diameter of the passage from the pressure side of the valve to the valve mounting axis and the other side of the valve from the axis thereof being inclined to meet the top wall of the reduced portion of the passage, the valve closing the passage when at right angles to the passage and opening the passage when parallel to it, and the valve with the casing defining a smooth continuation of the passage from the larger to the smaller portion thereof.

3. The combination with a pivotally mounted butterfly valve, of a casing forming a decreasing passage on the downstream side of the valve and in which the valve is mounted for oscillation upon a horizontal axis at the top of the passage, the upper portion of the casing passage adjacent said axis having a segmental space on the upstream side of the mounting axis in which the upper portion of the valve is rotatable and the remaining portion of the valve opening and closing the passage, and the upper portion of the valve having a larger effective area operative when head water pressure is applied to both the upper and lower portions of the valve to maintain the valve in closed position.

4. The combination with a pivoted butterfly valve, of casing means forming a passage closed by the valve decreasing in size toward the downstream side of the valve, a pivot for mounting the valve to swing in the casing at one side of the passage, means forming a segmental space into which one portion of the valve is movable to correspondingly move the other portion of the valve to open and close the passage, the first portion of the valve being slightly larger in area than the other portion thereof and operative when both portions of the valve are engaged by head water pressure to maintain the valve in closed position with the said other portion across the passage, the space at the downstream side of the first valve portion having means for venting it to the downstream side of the passage, and means to add pressure from the upstream side of the valve to the space at the downstream side of the first valve portion thereby decreasing the pressure difference at opposite sides of the first valve portion and allowing the pressure on the said other portion of the valve to move the valve to open position.

5. The combination with a butterfly valve having opposite tapered sides, a casing for the valve having a passage decreasing in size from the downstream side of the valve, a pivot axis mounting said valve at one side of said passage, said valve having a portion of larger effective area on one side of said pivot axis and a portion of smaller effective area on the opposite side of the pivot axis, the smaller portion of the passage being closed by the smaller effective area portion of the valve, means forming a segmental cylindrical space into which the larger effective area portion of the valve is movable at the upstream side of the pivot, means sealing all of the edges of the valve in the passage and in the said space thereof, means connecting the upstream side of the passage to the space at the downstream side of the valve portion therein in its open position, tending to equalize the pressure on opposite sides of this portion of the valve for opening said valve by fluid pressure from the upstream side of the passage, and means connecting the downstream side of said space to the downstream side of the passage for closing the valve by fluid pressure from the upstream side of the passage.

6. The combination with a butterfly valve, of a casing for the valve having a passage closed by one portion of the valve, the valve being pivotally mounted in one wall of the casing, and the casing having a space into which an adjacent portion of the valve is movable, the valve portion movable in the space having a slightly larger effective area than the other portion of the valve which extends across the passage to close it, fluid pressure from the upstream side of the passage being therewith effective to maintain the valve in closed position when this pressure is applied to both upstream portions of the valve, means for adding pressure to the said space to equalize the pressure on opposite sides of this portion of the valve and to open the valve by fluid pressure in the passage on the other portion of the valve, and means connecting the space with the downstream relief side of the passage for unbalancing pressure in the said space on opposite sides of valve portion therein to close the valve due to the upstream fluid pressure on both portions of the valve.

7. A valve structure in accordance with claim 6, in which an air relief space is provided in the casing for receiving the closing portion of the valve in its open position and means connecting this chamber to exhaust air therefrom when the valve is open and to supply air thereto when the valve is partially open to furnish air to the discharging downstream water, thus relieving vacuum behind the partially open valve and tending to prevent vibration of the valve.

8. A butterfly valve structure in accordance with claim 6, in which the pivotal mounting axis for the valve comprises a mounting shaft having two sections projecting at opposite sides from the valve and means for moving the sections at least flush with the sides of the valve and outwardly therefrom to provide bearings, bearing means in the sides of the passage for engaging the shaft sections and said space having a removable cover adjacent the valve with a chamber beyond said cover whereby the valve may be transferred into said chamber when the said shaft sections are drawn inwardly to clear the sides of the passage and the said cover is removed.

9. A butterfly valve in combination with a casing having a passage therein, the butterfly valve being enclosed in the casing and pivoted in the wall of the passage so that a portion of the valve moves to close the passage, the passage being reduced in size on the downstream side of the valve and having a space in the wall of the casing adjacent the pivot mounting axis of the valve for receiving the remaining portion of the valve therein, and the valve being tapered at opposite sides of its pivot mounting axis toward the outer ends thereof to merge with the downstream side of the passage and to form a reducing inclination to and flush with the surface of the larger upstream portion of the passage when the valve is open.

10. A combination with a butterfly valve, of a casing in which the valve is mounted forming a decreasing passage on the downstream side of the valve and in which the valve is pivotally mounted upon an axis at one side of the passage, the casing having a segmental space on the upstream pressure side of the axis in which a portion of the valve is rotatable with the opposite portion of the valve opening and closing the passage, and the casing also having a space on the downstream side of the valve mounting axis to receive the said opposite portion of the valve when the valve is open, the valve forming a smooth continuation of the passage from the larger to the smaller portion thereof when the valve is open, and the portion of the valve at the upstream side of the axis being slightly larger in effective area than the opposite portion of the valve and operative when the upstream head water pressure is applied to both upstream side portions of the valve at opposite sides of the axis thereof operative to maintain the valve in position to close the passage.

11. A butterfly valve structure including a casing having a passage therein, a butterfly valve, means pivotally mounting said butterfly valve at one side of said passage, said passage having a recess in one wall thereof upstream of said mounting means, said butterfly valve having a portion of larger area on one side of said mounting means and a portion of smaller area on the other side, said valve being pivotal between open and closed positions, the valve in said open position being substantially parallel to the axis of said passage and lying substantially flush with a wall of said casing, the larger area portion being upstream relative to the smaller area portion, in the closed position the larger area portion fitting into said recess and smaller area portion fitting across said passage to close off said passage, static pressure on said larger area portion tending to hold said valve in closed position, and means for effecting pivotal movement of said valve between open and closed positions.

12. A butterfly valve structure as set forth in claim 11 wherein the means for effecting pivotal movement of said valve includes means for providing fluid pressure in said recess behind said larger area valve portion approaching the static pressure of fluid in said passage against said valve whereby said static pressure will open said valve, and means for reducing pressure in said recess below that of a combined static and velocity head of fluid in said passage whereby such combined head will close said valve.

13. A butterfly valve structure as set forth in claim 11 wherein the valve has an arcuate surface concentric with the pivotal mounting means and extending between the portions of larger and smaller area on the downstream side of said valve, and said passageway has a sealing portion slidingly cooperating with said arcuate surface, said sealing portion and said arcuate surface coacting to seal said recess from the downstream portion of said passage.

References Cited in the file of this patent

UNITED STATES PATENTS

| Number | Name | Date |
|---|---|---|
| 160,226 | Pierce | Feb. 23, 1875 |
| 373,848 | Pearsall | Nov. 29, 1887 |
| 904,497 | Cowdrey | Nov. 17, 1908 |
| 1,059,037 | Collar | Apr. 15, 1913 |
| 1,860,619 | Pfau | May 31, 1932 |
| 1,916,632 | Mueller | July 4, 1933 |
| 2,054,258 | Kinzie | Sept. 15, 1936 |
| 2,510,938 | Boots | June 6, 1950 |